Patented Feb. 10, 1948

2,435,763

UNITED STATES PATENT OFFICE 2,435,763

HYDROGEN BROMIDE CATALYZED OXIDATION REACTIONS

William E. Vaughan, Berkeley, Calif., and Edward R. Bell, Norwalk, Ohio, assignors to Shell Development Company, San Francisco, Calif., a corporation of Delaware No Drawing. Application March 13, 1944, Serial No. 526,335

13 Claims. (Cl. 260—610)

This invention relates to processes dealing with the controlled oxidation of organic compounds, and more particularly to improvements for effecting the production and recovery, on an industrially practical scale, of oxygenated and/or oxidized organic compounds which are formed by the controlled oxidation with oxygen (or an oxygen-containing material, e. g. air) of organic compounds in the presence of hydrogen bromide employed as a catalyst. The invention is particularly directed to a novel process of treating the reaction products of such controlled catalytic oxidation of organic compounds, whereby great flexibility, ease of control, and marked economy and efficiency are attainable, while eliminating or at least greatly reducing certain undesirable side reactions which usually accompany the controlled oxidation reactions and decrease the yield of the desired oxygenated organic compounds.

Although it is known that various hydrocarbons and their derivatives may be oxidized by subjecting them to the action of oxygen or other oxidizing substances both in the presence and in the absence of various catalysts, as a general rule, most if not all of these oxidation reactions result in considerable decomposition of the starting organic material, the reaction mixtures thus formed comprising various percentages of compounds which have been oxidized to a greater or lesser degree, and contain varied numbers of carbon atoms per molecule due to carbon-to-carbon bond scission and to other side reactions of the type of polymerization and condensation.

Although most of the oxygenated organic compounds formed as a result of partial (incomplete) oxidations of hydrocarbons and/or their organic derivatives are generally more valuable than the primary materials subjected to the oxidation reaction, it is frequently desirable to obtain reaction products which predominate in carboxylic acids, organic peroxides and/or ketones rather than in complex mixtures containing these or some of these compounds together with large amounts of other oxygenated compounds such as carbon dioxide, aldehydes, alcohols, lactones, etc., which may or may not have the same number of carbon atoms per molecule as the starting organic material. Also, it is usually desirable to obtain predetermined oxygenated compounds having the same number of carbon atoms per molecule as the starting organic material, or twice the number of carbon atoms present in such material.

It has been discovered that the above-mentioned and other desired results may be attained by subjecting organic compounds having at least one replaceable hydrogen atom to a partial and controlled oxidation in the presence of hydrogen bromide employed as a catalyst. More specifically stated, it was found that the above-mentioned and hereinbelow more fully described class of organic compounds may be subjected to a controlled non-explosive oxidation (with oxygen or an oxygen-containing material, e. g. air) in the presence of a catalyst consisting of or comprising hydrogen bromide, this oxidation being effected at temperatures between about 100° C. and the spontaneous combustion temperature of the mixture, in the dark or under the deliberate influence of ultraviolet radiations (particularly those having wave-lengths of below about 2900 to 3000 Angstrom units), and in the presence or absence of certain substances which sensitize the reaction; and that such a reaction results in the formation of high yields of desirable carboxylic acids, organic peroxides, organic hydroperoxides, phenols and/or ketones containing at least the same number of carbon atoms per molecule as the starting organic material thus subjected to oxidation. This is disclosed and claimed in U. S. patent, Number 2,423,949, as well as in the various patent applications mentioned therein.

The above-outlined inventions are predicated on the discovery that the presence of the hydrogen bromide during the oxidation of the mentioned class of organic compounds controls the oxidation reaction so that said oxidation occurs on the carbon atom or atoms to which a halogen atom, e. g. a bromine atom, would normally attach itself if the starting material were to be subjected to a halo-substitution reaction. Also, the presence of the hydrogen bromide, besides retarding the explosion or complete combustion of the starting organic material, has the effect of inhibiting the decomposition of the carbon structure of such organic material, so that the resultant oxygenated compound or compounds contain the same number of carbon atoms per molecule as the starting organic material or, as in the case of certain organic peroxides (formed by such oxidation), contain twice the number of carbon atoms per molecule as are present in the organic material treated.

The above outlined controlled catalyzed oxidation is applicable to the treatment of all organic compounds containing at least one replaceable hydrogen atom, the process being particularly applicable to the controlled oxidation of aliphatic hydrocarbons, particularly saturated straight chain and branched chain aliphatic hydrocarbons, as well as of aromatic hydrocarbons, alkylated aromatic hydrocarbons and alicyclic hydrocarbons which may or may not contain one or more saturated or unsaturated aliphatic side chains, and of their derivatives such as products of their partial halo-substitution. Also, various other organic derivatives, e. g. nitriles, ketones, etc. fall within the class of compounds which may be thus catalytically oxidized in the presence of hydrogen bromide. For example, the oxidation of methyl ethyl ketone results in the production of diacetyl.

Even when the hydrogen bromide catalyzed oxidation of organic compounds of the above defined class with oxygen is effected under the optimum operating conditions for the particular reactants, etc., the resulting reaction product ordinarily contains a certain, although normally relatively small, percentage of by-products. The presence of some of these by-products in the reaction product is not only undesirable but frequently quite harmful, in that it may materially lower the ultimate or recoverable yield of the desired oxygenated organic product or products. It has now been discovered that the hydrogen bromide which acts as the catalyst to promote and control the aforesaid oxidation reaction is partially decomposed during the oxidation reaction, i. e. during the passage of the reactants and hydrogen bromide through the oxidation reaction zone to form, inter alia, molecular bromine. It has also been discovered that the presence of molecular bromine in the reaction products leaving the oxidation zone is undesirable and detrimental since it catalyzes or promotes certain side reactions which materially lower the amount of the desired oxygenated organic product or products that may be recovered from the reaction mixture. For instance, the reaction of a saturated tertiary alkyl hydrocarbon, e. g. isobutane, with oxygen in the presence of hydrogen bromide, and at a temperature of between about 100° C. and the spontaneous combustion temperature of the mixture, results in the formation of the corresponding tertiary alkyl hydroperoxide, namely tertiary butyl hydroperoxide. It has been found that molecular bromine catalyzes the decomposition of this hydroperoxide, particularly when water is present. This liquid phase decomposition will form the corresponding alcohol and hydrogen bromide in accordance with the following equation:

$$ROOH + Br_2 + H_2O \rightarrow ROH + 2HBr + O_2$$

wherein R represents a tertiary alkyl radical. Also, in accordance with the above-mentioned discoveries, phenols are formed when aromatic hydrocarbons are oxidized in the presence of the hydrogen bromide catalyst. The bromine formed as a by-product of this reaction may react with these valuable phenols to produce undesirable bromophenols. One of the main objects of the present invention is to render the molecular bromine innocuous, thereby increasing the amount of desirable oxygenated product or products that may be recovered from the reaction mixture formed as a result of the mentioned hydrogen bromide catalyzed oxidation reaction.

Although the mentioned oxidation of the organic compounds in the presence of hydrogen bromide may be effected in the liquid phase, it is generally preferable to conduct the oxidation in the vapor phase because it is difficult to maintain a desirable relatively high oxygen concentration when the reaction is conducted in the liquid phase. It has been found that the detrimental effect of the molecular bromine formed as a by-product of this reaction is particularly strong during the condensation of the reaction products leaving the oxidation reaction zone, as well as in the liquid phase formed by such condensation. Without any intention of being limited by any theory of the case, this is believed to be due, at least in part, to the relatively more intimate contact between the bromine and the reaction products when these are in the liquid state. It has now been discovered that the above and other objects may be attained by contacting the reaction products with a compound or compounds which will render harmless any molecular bromine that may be present in such reaction products. In view of the detrimental effect of the bromine on at least some of the desired oxygenated organic products, which is especially severe when these are in the liquid phase, the immunization of the liquid bromine is preferably effected in accordance with the process of the present invention prior to substantial liquefaction of the reaction products leaving the oxidation reaction zone. This may be realized by contacting the effluent reaction products with the above mentioned compound or compounds substantially as soon as the reaction products leave the oxidation reaction zone. A preferred method of rendering the bromine innocuous is to contact the bromine-containing reaction product (substantially immediately after it leaves the oxidation reaction zone) with a suitable unsaturated organic compound, preferably an olefin, thereby causing the bromination, via addition, of the unsaturated organic compound to form saturated organic bromides, the presence of which in the reaction product is inoffensive in that these bromides will not catalyze any undesirable side reactions and will not react with the desired oxygenated organic compounds formed during the hydrogen bromide catalyzed oxidation reaction.

The introduction of the unsaturated organic compound into the effluent reaction product, coupled with the fact that the latter comes in contact with the relatively cold walls of the exit pipe which conveys said reaction product to a condenser or other receiver, will cause at least a partial condensation of the mixture. The reaction between the added unsaturated organic compound, e. g. an olefin, and the bromine is thereby facilitated since addition of bromine to olefins proceeds at a satisfactory rate even at the point of incipient condensation.

Any unsaturated organic compound may be employed as the reagent to be added to the reaction products for purposes of reacting with the bromine present therein. This class of compounds includes the various unsaturated hydrocarbons and particulraly the hydrocarbons which contain one or more olefinic linkages of aliphatic character. A particularly suitable group of compounds comprises the olefins, and particularly the lower-boiling homologues thereof, e. g. ethylene, propylene, butylenes, pentenes, etc. It is to be noted that the tertiary olefins tend to undergo halo-substitution to the substantial exclusion of halogen addition, even at ordinary and reduced temperatures. On the other hand, in the case of unsaturated compounds of primary and secondary character, the reaction of halo-substitution does not occur at all at such ordinary and reduced temperatures, the normal halogenation reaction of such unsaturated compounds of primary and secondary character being, at ordinary and even considerably elevated temperatures, that of halogen addition. Therefore, if it is desired to convert all of the bromine formed as a by-product of the above mentioned catalyzed oxidation reaction into organic bromides, it is preferable in accordance with the process of the present invention to introduce into the effluent reaction product an unsaturated organic compound of a primary or secondary character, e. g. a straight-chain, particularly a low-boiling straight-chain olefin of the type of ethylene, propylene, normal butylenes, pentenes, etc. On the other hand, if it is desired to react the molecular bromine via substitution, which reaction may form hydrogen bromide as a by-product, reliance will be had on the use of a tertiary unsaturated organic compound, e. g. a tertiary olefin of the type of isobutylene and its higher homologues and analogues.

It was stated above that the preferred method of rendering the bromine innocuous is to introduce the unsaturated organic compound or compounds of the above defined class into the effluent reaction products leaving the reaction zone, this introduction being made substantially at the point of exit of the effluent mixture from said reaction zone. The amount of the unsaturated organic compound to be thus added will depend on a number of variables, such as the amount of bromine present, the particular unsaturated organic compound added, etc. Since the final mixture produced as a result of the reaction between the bromine and the unsaturated organic compound must be subsequently worked up to recover therefrom the desired oxygenated organic compound or compounds formed during the hydrogen bromide catalyzed oxidation reaction, and since this usually entails the fractionation of the liquefied organic phase, it is generally preferable to select an unsaturated organic compound the bromide of which boils at a temperature far removed from the boiling temperatures of the various oxygenated compounds to be separated from such mixture.

It has been mentioned above that tertiary alkyl hydroperoxides are readily formed by subjecting a saturated branched-chain hydrocarbon to the action of oxygen in the presence of small amounts of hydrogen bromide and at a temperature between about 100° C. and the spontaneous combustion temperature of the mixture. For instance, tertiary butyl hydroperoxide may be formed by reacting equivolumetric amounts of isobutane and oxygen in the presence of hydrogen bromide, this reaction being effected at temperatures of about 160° C. and for periods of time ranging from about 1 minute to about 3 minutes.

When a tertiary alkyl hydroperoxide is reacted at a temperature of between about 15° C. and about 50° C. with a saturated tertiary alkyl alcohol in the presence of an aqueous acid medium, such as an aqueous sulfuric acid solution, a di(tertiary alkyl) peroxide is formed, the two tertiary alkyl radicals of this peroxide corresponding to the radicals of the hydroperoxide and alcohol, respectively, used. Thus, a reaction of tertiary butyl hydroperoxide with tertiary butyl alcohol or tertiary amyl alcohol, under the defined conditions, results in the formation of di(tertiary butyl) peroxide or tert.-butyl,tert.-amyl peroxide. These peroxides are highly valuable compounds, and may be used in various organic reactions, as well as for other purposes. For instance, they may be used as additives to improve the cetane value of Diesel engine fuels, or as catalysts for the polymerization of polymerizable unsaturated compounds.

Because of the above mentioned value of the di-organic peroxides, and because under certain conditions of operation the hydrogen bromide catalyzed oxidation of tertiary alkyl hydrocarbons produces a relatively large proportion of the corresponding tertiary alkyl hydroperoxides, it is frequently desirable to contact the reaction mixture directly with the tertiary alcohol in the presence of an aqueous acid medium, without first treating the reaction mixture from said oxidation reaction to separate therefrom the organic hydroperoxide. For this purpose, the effluent products leaving the oxidation zone are cooled, thereby condensing the normally liquid compounds which are thus separated from the normally gaseous products, such as the unreacted hydrocarbons, oxygen and hydrogen bromide. The liquefied fraction (which contains the hydroperoxide) is then contacted with the desired tertiary alcohol in the presence of an aqueous acid medium. It has been found, however, that the molecular bromine in such condensate reacts with the alcohol to form the corresponding brom-hydrin which distributes itself in a certain ratio between both the organic phase and the aqueous phase. Although it is relatively easy to separate said bromhydrin from the organic phase, the recovery thereof from the aqueous acid phase presents many difficulties resulting in the loss of this bromhydrin. On the other hand, when the effluent mixture leaving the oxidation reaction zone is contacted with an olefin which, in accordance with the process of the present invention, is converted to the corresponding organic bromide, this latter upon condensation and reaction of the liquefied mixture with the alcohol (in the presence of, for example, an aqueous sulfuric acid solution) will be found as such in the organic phase, from which this organic bromide may be readily recovered, e. g. by fractional distillation. Since these organic bromides may then be readily treated to produce hydrogen bromide, and since the latter is a comparatively valuable and expensive compound, the overall cost of the controlled oxidation reaction is materially decreased, thereby rendering the oxidation process economical.

The detailed practice of the present invention may be conveniently described with reference to the production and recovery of di(tertiary butyl) peroxide and/or tertiary butyl hydroperoxide from the vaporous reaction mixture produced when isobutane is reacted with oxygen in the presence of a catalyst comprising hydrogen bromide and at an elevated temperature which depends largely on the particular starting material subjected to oxidation. As stated above, the effluent reaction mixture contains molecular bromine formed as a by-product; the concentration of the bromine will depend in part on the concentration of the hydrogen bromide in the starting mixture used. For instance, and as a specific example, when a gaseous mixture consisting of isobutane, oxygen and hydrogen bromide, employed in a volumetric ratio of 2:2:1, was conveyed through a reaction zone at a temperature of about 158° C. and with a contact time of about 3 minutes, approximately one third of the hydrogen bromide was converted to molecular bromine. This bromine, during the subsequent condensation of the liquefiable reaction products and the treatment thereof to recover the desired peroxides and the like, causes a decomposition of the tertiary butyl hydroperoxide, e. g. into tertiary butyl alcohol, so that only relatively small amounts of the tertiary butyl hydroperoxide are recovered from the reaction product. On the other hand, the contacting of the effluent mixture leaving the oxidation zone with an olefin, for example propylene, results in the bromination of the latter to form propylene bromide (1,2-dibromopropane), thereby rendering the bromine innocuous and markedly increasing the amount of the tertiary butyl hydroperoxide which may be recovered from the thus pretreated effluent mixture.

We claim as our invention:

1. In a process for the production of di(tertiary butyl) peroxide which comprises reacting a vaporous mixture comprising isobutane and oxygen in the presence of hydrogen bromide at a temperature between about 100° C. and the temperature at which spontaneous combustion of the mixture occurs and wherein said reaction is effected for a sufficient period of time to cause controlled catalytic oxidation of the isobutane whereby said isobutane is oxidized to tertiary butyl hydroperoxide and whereby at least a portion of the hydrogen bromide is converted to bromine, the improvement comprising contacting the effluent reaction mixture thus formed with propylene thereby effecting a reaction between said propylene and the bromine present in the effluent mixture, separating the normally liquid fraction from the resulting reaction mixture, said fraction containing the tertiary butyl hydroperoxide, contacting said normally liquid fraction with tertiary butyl alcohol in the presence of an aqueous sulfuric acid solution at a temperature of between about 15° C. and about 50° C. and recovering di(tertiary butyl) peroxide from the reaction mixture thus produced.

2. A process for the production of di(tertiary butyl) peroxide which comprises reacting a vaporous mixture comprising isobutane and oxygen in the presence of hydrogen bromide and at a temperature of between about 100° C. and the temperature at which spontaneous combustion of the mixture occurs, effecting said reaction for a period of time sufficient to cause controlled catalytic oxidation of the isobutane whereby said isobutane is oxidized to tertiary butyl hydroperoxide and whereby at least a portion of the hydrogen bromide is converted to bromine, contacting at least a portion of the effluent reaction mixture, substantially as soon as it is formed, with a low-boiling straight-chain olefin, thereby effecting a reaction between said olefin and the bromine present in the effluent mixture, separating the normally liquid fraction from the resulting reaction mixture, said fraction containing the tertiary butyl hydroperoxide, contacting said fraction with tertiary butyl alcohol in the presence of an aqueous sulfuric acid solution at a temperature of between about 15° C. and about 50° C., and recovering di(tertiary butyl) peroxide from the reaction mixture thus produced.

3. A process for the production of a di-alkyl peroxide which comprises reacting a vaporous mixture comprising isobutane and oxygen in the presence of hydrogen bromide and at a temperature of between about 100° C. and the temperature at which spontaneous combustion of the mixture occurs, effecting said reaction for a period of time sufficient to cause controlled oxidation of the isobutane, whereby said isobutane is oxidized to tertiary butyl hydroperoxide and whereby at least a portion of the hydrogen bromide is converted to bromine, contacting at least a portion of the effluent reaction mixture thus formed with a low-boiling olefin, thereby effecting a reaction between said olefin and the bromine present in the effluent mixture, separating the normally liquid fraction from the resulting reaction mixture, said fraction containing the tertiary butyl hydroperoxide, contacting said fraction with a saturated tertiary alkyl alcohol in the presence of an aqueous acid medium and at a temperature of between about 15° C. and about 50° C., and recovering the di(tertiary alkyl) peroxide from the reaction mixture thus produced.

4. A process for the production of organic peroxides which comprises subjecting an organic compound containing at least one tertiary carbon atom of aliphatic character, said tertiary carbon atom having a replaceable hydrogen atom directly attached thereto, to the action of oxygen in the presence of hydrogen bromide and at a temperature of between about 100° C. and the temperature at which spontaneous combustion of the mixture occurs, effecting the reaction for a period of time sufficient to cause controlled catalytic oxidation of said tertiary carbon atom-containing organic compound, whereby the corresponding organic hydroperoxide is produced and whereby at least a portion of the hydrogen bromide is converted to bromine, contacting at least a portion of the effluent reaction mixture thus formed with an olefin, thereby effecting a reaction between said olefin and the bromine, reacting at least a portion of the resulting reaction mixture with a tertiary alcohol in the presence of an aqueous acid solution, and recovering the di-organic peroxide from the reaction mixture thus produced.

5. In a process for the production of di(tertiary butyl) peroxide in which process isobutane is reacted with oxygen in the presence of hydrogen bromide at a temperature of between about 100° C. and the spontaneous combustion temperature of the mixture, to produce an effluent product containing tertiary butyl hydroperoxide and bromine formed by the decomposition of the hydrogen bromide, and wherein the tertiary butyl hydroperoxide is reacted with tertiary butyl alcohol in the presence of an aqueous sulfuric acid solution to form di(tertiary butyl) peroxide, the improvement which comprises contacting the effluent reaction mixture produced as the result of the oxidation step with propylene to effect a reaction between said propylene and the bromine, thereby rendering the latter innocuous during the subsequent interaction of the tertiary butyl hydroperoxide with the tertiary butyl alcohol.

6. In a process for the production of organic peroxides wherein a saturated aliphatic hydrocarbon containing a tertiary carbon atom is reacted with oxygen in the presence of hydrogen bromide and at a temperature of between about 100° C. and the temperature at which spontaneous combustion occurs, and wherein the tertiary alkyl hydroperoxide thus formed is reacted with a tertiary alcohol in the presence of an aqueous acid solution to form the di-organic peroxide, the improvement which comprises contacting the effluent mixture from the oxidation step with a low-boiling straight-chain olefin to effect a reaction between said olefin and the bromine formed as a by-product, thereby rendering said bromine innocuous in the subsequent step in which the di-organic peroxide is formed.

7. In a process for the production of di-organic peroxides whereby an organic compound containing at least one tertiary carbon atom of aliphatic character, said tertiary carbon atom having a replaceable hydrogen atom directly attached thereto, is reacted with oxygen in the presence of hydrogen bromide and at an elevated temperature below that at which spontaneous combustion of the mixture occurs, and wherein the organic hydroperoxide thus formed is reacted with a tertiary alcohol in the presence of an aqueous acid solution to form the di-organic peroxide, the improvement which comprises contacting the effluent mixture produced during the oxidation step with an olefin to effect a reaction thereof with bromine formed as a by-product during the oxidation reaction step, thereby rendering said bromine innocuous.

8. In a process for the production of tertiary butyl hydroperoxide wherein isobutane and oxygen are reacted in the presence of hydrogen bromide at a temperature of between about 100° C. and the spontaneous combustion temperature of the mixture, thereby forming an effluent reaction mixture containing tertiary butyl hydroperoxide and bromine formed as a by-product of the decomposition of hydrogen bromide, and wherein the tertiary butyl hydroperoxide is recovered from said effluent reaction mixture, the improvement which comprises contacting the effluent reaction mixture with propylene, thereby effecting a reaction between said propylene and the bromine.

9. In a process for the production of tertiary butyl hydroperoxide which comprises reacting a vaporous mixture comprising isobutane and oxygen in the presence of hydrogen bromide at a temperature of between about 100° C. and the temperature at which spontaneous combustion of the mixture occurs and wherein said reaction is effected for a sufficient period of time to cause the controlled catalytic oxidation of the isobutane whereby said isobutane is oxidized to tertiary butyl hydroperoxide and whereby at least a portion of the hydrogen bromide is converted to bromine, the improvement comprising contacting the effluent reaction mixture thus formed with propylene thereby effecting a reaction between said propylene and the bromine and recovering the tertiary butyl hydroperoxide from the resulting reaction mixture.

10. A process for the production of tertiary butyl hydroperoxide which comprises reacting a vaporous mixture comprising isobutane and oxygen in the presence of hydrogen bromide and at a temperature of between about 100° C. and the temperature at which spontaneous combustion of the mixture occurs, effecting said reaction for a period of time sufficient to cause controlled catalytic oxidation of the isobutane, whereby said isobutane is oxidized to tertiary butyl hydroperoxide and whereby at least a portion of the hydrogen bromide is converted to bromine, contacting the effluent reaction mixture thus formed with a low-boiling straight-chain olefin, thereby effecting a reaction between said olefin and the bromine, and recovering the tertiary butyl hydroperoxide from the resulting reaction mixture.

11. In a process for the production of a tertiary alkyl hydroperoxide wherein a vaporous mixture comprising oxygen and a saturated aliphatic hydrocarbon containing a tertiary carbon atom is reacted in the presence of hydrogen bromide and at an elevated temperature below the spontaneous combustion temperature of the mixture, the improvement which comprises contacting the effluent mixture thus formed with a low-boiling olefin to effect a reaction between said olefin and bromine formed as a by-product of the reaction, thereby rendering the bromine innocuous during the subsequent recovery of the tertiary alkyl hydroperoxide.

12. In a process for the production of organic peroxides, wherein an organic compound containing at least one tertiary carbon atom of aliphatic character, said tertiary carbon atom having a replaceable hydrogen atom directly attached thereto, is reacted with oxygen in the presence of hydrogen bromide and at an elevated temperature below that at which spontaneous combustion of the mixture occurs, the improvement which comprises contacting the effluent reaction mixture thus formed, said mixture containing organic peroxides and bromine, with an olefin substantially as soon as said mixture is formed, to effect a reaction between said olefin and the bromine, and to render said bromine innocuous.

13. In a process for the controlled oxidation of organic compounds to produce oxygenated compounds having at least the same number of carbon atoms per molecule as the starting organic compound, which process comprises subjecting an organic compound having at least one replaceable hydrogen atom to the action of oxygen and of hydrogen bromide at an elevated temperature below that at which spontaneous combustion occurs, the improvement which comprises contacting the effluent reaction mixture thus formed with an olefin substantially as soon as said mixture is formed, to effect a reaction between said olefin and bromine formed as a by-product of the oxidation reaction.

WILLIAM E. VAUGHAN.
EDWARD R. BELL.

REFERENCES CITED

The following references are of record in the file of this patent:

UNITED STATES PATENTS

| Number | Name | Date |
|---|---|---|
| 2,088,159 | Boundy | July 27, 1937 |
| 2,108,011 | Dressel | Feb. 8, 1938 |

OTHER REFERENCES

Willstatter, "Annalen der Chemie," vol. 354, 1907, pages 248, 249, 255, 256. (Copy in Patent Office Library.)